United States Patent
Watts et al.

(10) Patent No.: US 11,940,621 B2
(45) Date of Patent: Mar. 26, 2024

(54) TWO DIMENSIONAL OPTICAL PHASED ARRAYS USING EDGE-COUPLED INTEGRATED CIRCUITS

(71) Applicant: Analog Photonics LLC, Boston, MA (US)

(72) Inventors: Michael Robert Watts, Hingham, MA (US); Ehsan Shah Hosseini, Boston, MA (US); Benjamin Roy Moss, Cambridge, MA (US); Christopher Vincent Poulton, Cambridge, MA (US)

(73) Assignee: Analog Photonics LLC, Boston, MA (US)

( * ) Notice: Subject to any disclaimer, the term of this patent is extended or adjusted under 35 U.S.C. 154(b) by 411 days.

(21) Appl. No.: 17/464,918

(22) Filed: Sep. 2, 2021

(65) Prior Publication Data

US 2022/0075186 A1      Mar. 10, 2022

Related U.S. Application Data

(60) Provisional application No. 63/074,611, filed on Sep. 4, 2020.

(51) Int. Cl.
*G02B 27/00*     (2006.01)
*G01S 7/481*     (2006.01)
(Continued)

(52) U.S. Cl.
CPC ........ *G02B 27/0087* (2013.01); *G01S 7/4815* (2013.01); *G02B 3/0056* (2013.01); *G02F 1/2955* (2013.01); *G02F 2203/24* (2013.01)

(58) Field of Classification Search
CPC .. G02B 27/0087; G02B 3/0056; G02B 26/08; G01S 7/4815; G02F 1/2955; G02F 2203/24
See application file for complete search history.

(56) References Cited

U.S. PATENT DOCUMENTS

| 6,128,421 A | 10/2000 | Roberts |
| 6,370,284 B1 | 4/2002 | Shekel et al. |

(Continued)

OTHER PUBLICATIONS

Yongjun Guo et al., "Integrated Optical Phased Arrays for Beam Forming and Steering", Applied Sciences, Apr. 28, 2021, pp. 1-41, https://doi.org/10.3390/app11094017.
(Continued)

*Primary Examiner* — John Bedtelyon

(57) ABSTRACT

An apparatus comprises: a first integrated circuit comprising: a plurality of sets of optical waveguides, each set of optical waveguides including a plurality of optical waveguide segments, and a plurality of optical emitter elements arranged over a first surface of the first integrated circuit, each optical emitter element coupled to a distal end of one of the optical waveguide segments; and a second integrated circuit comprising: a plurality of optical phase shifters that each provide a phase-shifted optical wave that is coupled to the first integrated circuit from a first edge surface of the second integrated circuit. The first edge surface of the second integrated circuit is in proximity to a row of proximal ends of the optical waveguide segments of a first set of the plurality of sets of optical waveguides.

20 Claims, 17 Drawing Sheets

(51) Int. Cl.
*G02B 3/00* (2006.01)
*G02F 1/295* (2006.01)

(56) References Cited

U.S. PATENT DOCUMENTS

| | | |
|---|---|---|
| 9,476,981 B2 | 10/2016 | Yaacobi et al. |
| 9,647,187 B1 * | 5/2017 | Yap ................ G01S 7/4817 |
| 9,726,818 B1 | 8/2017 | Yap et al. |
| 9,753,351 B2 | 9/2017 | Eldada |
| 10,613,411 B1 | 4/2020 | Yap et al. |
| 10,775,559 B2 | 9/2020 | Watts et al. |
| 2003/0128905 A1 | 7/2003 | Kambe et al. |
| 2018/0217258 A1 | 8/2018 | Hirasawa et al. |
| 2019/0056634 A1 | 2/2019 | Hosseini et al. |
| 2019/0094651 A1 | 3/2019 | Timurdogan et al. |
| 2019/0204419 A1 | 7/2019 | Baba et al. |
| 2019/0265574 A1 | 8/2019 | Skirlo et al. |

OTHER PUBLICATIONS

Farshid Ashtiani et al., "NxN Optical Phased Array with 2N Phase Shifters", Optics Express, vol. 27, No. 19, Sep. 16, 2019, pp. 27183-27190.
Binbin Guan et al., "Hybrid 3D Photonic Integrated Circuit for Optical Phased Array Beam Steering", CLEO: 2015, OSA Technical Digest, Optical Society of America 2015, May 10-15, 2015, pp. 1-2, https://doi.org/10.1364/CLEO_SI.2015.STu2F.1.

* cited by examiner

TWO DIMENSIONAL OPTICAL PHASED ARRAYS USING EDGE-COUPLED INTEGRATED CIRCUITS

CROSS-REFERENCE TO RELATED APPLICATION(S)

This application claims priority to and the benefit of U.S. Provisional Application Ser. No. 63/074,611, entitled "TWO DIMENSIONAL OPTICAL PHASED ARRAYS," filed Sep. 4, 2020, the entire disclosure of which is hereby incorporated by reference.

TECHNICAL FIELD

This disclosure relates to two dimensional optical phased arrays using edge-coupled integrated circuits.

BACKGROUND

Steering of electromagnetic beams over a large range (e.g., over a whole hemispherical space) is useful for a variety of applications, such as display, communications, radar, and lidar applications. In both radio frequency (RF) and optical domains two dimensional phased arrays can steer the beam by assigning predefined phases to individual elements of an array. In the optical domain, high performance two dimensional (2D) optical phased arrays may be difficult to implement because of the difficulty close packing of light emitters in systems in which the phase shifting elements, the light delivery system, and/or the output couplers (e.g., emitter elements) share space on the emitting chip.

SUMMARY

In one aspect, in general, an apparatus comprises: a first integrated circuit comprising: a plurality of sets of optical waveguides, each set of optical waveguides including a plurality of optical waveguide segments, and a plurality of optical emitter elements arranged over a first surface of the first integrated circuit, each optical emitter element coupled to a distal end of one of the optical waveguide segments; a second integrated circuit comprising: a plurality of optical phase shifters that each provide a phase-shifted optical wave that is coupled to the first integrated circuit from a first edge surface of the second integrated circuit; and a third integrated circuit comprising: a plurality of optical phase shifters that each provide a phase-shifted optical wave that is coupled to the first integrated circuit from a first edge surface of the third integrated circuit. The first edge surface of the second integrated circuit is in proximity to a row of proximal ends of the optical waveguide segments of a first set of the plurality of sets of optical waveguides, and the first edge surface of the third integrated circuit is in proximity to a row of proximal ends of the optical waveguide segments of a second set of the plurality of sets of optical waveguides.

Aspects can include one or more of the following features.

The second integrated circuit and the third integrated circuit are each substantially perpendicular to the first integrated circuit.

In each set of optical waveguides, the plurality of optical waveguide segments in that set of optical waveguides are substantially parallel to each other.

All of the plurality of optical waveguide segments in all of the sets of optical waveguides are substantially parallel to each other.

In each set of optical waveguides, a plurality of optical waveguide segments in that set of optical waveguides have a different length from each other.

The plurality of optical emitter elements coupled to the distal ends of the optical waveguide segments in at least one of the sets of optical waveguides are arranged to emit optical waves from the first surface of the first integrated circuit along a line that is between 5 and 60 degrees relative to each of the parallel optical waveguide segments.

At least a first of the phase-shifted optical waves coupled to the first integrated circuit from the first edge surface of the second integrated circuit is coupled to a proximal end of a first optical waveguide segment of the first set of the plurality of sets of optical waveguides in a first layer of the first integrated circuit.

The first phase-shifted optical wave is coupled to the proximal end of the first optical waveguide segment by a portion of a waveguide in a second layer of the first integrated circuit that is closer to a surface of the first integrated circuit than the first layer of the first integrated circuit.

The first phase-shifted optical wave is coupled to the proximal end of the first optical waveguide segment by a reflective surface in the first integrated circuit configured to redirect the phase-shifted optical wave into the proximal end of the first optical waveguide segment.

The first surface of the first integrated circuit is a surface adjacent to the first edge surface of the second integrated circuit and the first edge surface of the third integrated circuit.

The first surface of the first integrated circuit is a surface opposite from a surface adjacent to the first edge surface of the second integrated circuit and the first edge surface of the third integrated circuit.

The second integrated circuit comprises: a first optical distribution network of waveguide splitters that provide optical waves to the plurality of optical phase shifters of the second integrated circuit; and the third integrated circuit comprises: a second optical distribution network of waveguide splitters that provide optical waves to the plurality of optical phase shifters of the third integrated circuit.

The first optical distribution network and the second optical distribution network are coupled to an optical waveguide in the first integrated circuit.

The second integrated circuit is coupled to a fourth integrated circuit that provides electrical control signals to the plurality of optical phase shifters of the second integrated circuit; and the third integrated circuit is coupled to a fifth integrated circuit that provides electrical control signals to the plurality of optical phase shifters of the third integrated circuit.

The second integrated circuit and the third integrated circuit are included in a stack of phase shifter integrated circuits providing phase-shifted optical waves that form a structure that has a surface that includes edge surfaces of all of the phase shifter integrated circuits.

The second integrated circuit includes a plurality of trenches filled with conductive material that end at the surface of the structure; and the third integrated circuit includes a plurality of trenches filled with conductive material that end at the surface of the structure.

A plurality of conductive pads are formed on the surface of the structure in contact with the ends of the trenches of the second integrated circuit and the ends of the trenches of the third integrated circuit.

In another aspect, in general, an apparatus comprises: a first integrated circuit comprising: a plurality of sets of optical waveguides, each set of optical waveguides including a plurality of optical waveguide segments, and a plurality of optical emitter elements arranged over a first surface of the first integrated circuit, each optical emitter element coupled to a distal end of one of the optical waveguide segments, with a plurality of the optical emitter elements spaced at a first pitch; and a second integrated circuit comprising: a plurality of optical phase shifters that each provide a phase-shifted optical wave that is coupled to the first integrated circuit from a first edge surface of the second integrated circuit, with a plurality of the optical phase shifters spaced at a second pitch substantially equal to the first pitch. The first edge surface of the second integrated circuit is in proximity to a row of proximal ends of the optical waveguide segments of a first set of the plurality of sets of optical waveguides.

Aspects can include the following feature.

The second integrated circuit is substantially perpendicular to the first integrated circuit.

In another aspect, in general, a method comprises: forming a first integrated circuit comprising: a plurality of sets of optical waveguides, each set of optical waveguides including a plurality of optical waveguide segments, and a plurality of optical emitter elements arranged over a first surface of the first integrated circuit, each optical emitter element coupled to a distal end of one of the optical waveguide segments, with a plurality of the optical emitter elements spaced at a first pitch; and attaching a second integrated to the first integrated circuit, the second integrated circuit comprising: a plurality of optical phase shifters that each provide a phase-shifted optical wave that is coupled to the first integrated circuit from a first edge surface of the second integrated circuit, with a plurality of the optical phase shifters spaced at a second pitch substantially equal to the first pitch. The first edge surface of the second integrated circuit is in proximity to a row of proximal ends of the optical waveguide segments of a first set of the plurality of sets of optical waveguides.

Aspects can have one or more of the following advantages.

The techniques described herein can be used to address some of the challenges associated with achieving a relatively dense packing of light emitters in a 2D optical phased array. In some examples described herein, a 1D array of tight pitched phase shifters is coupled to a row of emitter elements in an array of emitter elements to achieve a moderate pitch 2D optical phased array. The techniques also enable distribution of optical and electrical signal pathways among multiple integrated circuits arranged in a relatively compact structure.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

For an optical phased array (OPA) that has emitter elements arranged over two dimensions, referred to herein as a 2D OPA, the far field pattern of emission (e.g., beyond the Fraunhofer range) can be estimated by the Fourier transform of the near field pattern of emission. The far field pattern of emission can be computed as an array factor characterizing the spatial arrangement of the emitter elements multiplied by an element factor of the typically identical emitter elements.

Figure 1:
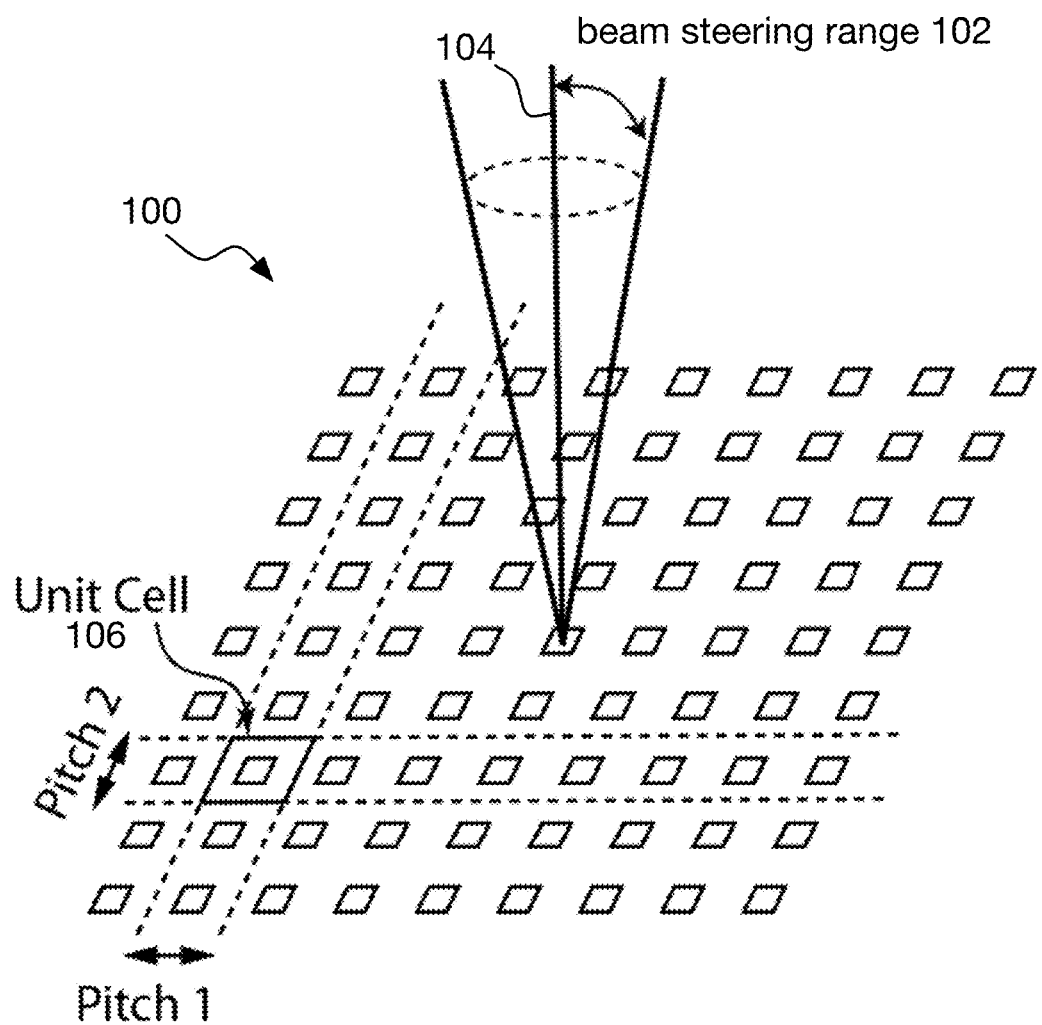
FIG. 1 is a schematic diagram of an optical phased array.
Figure 2A:
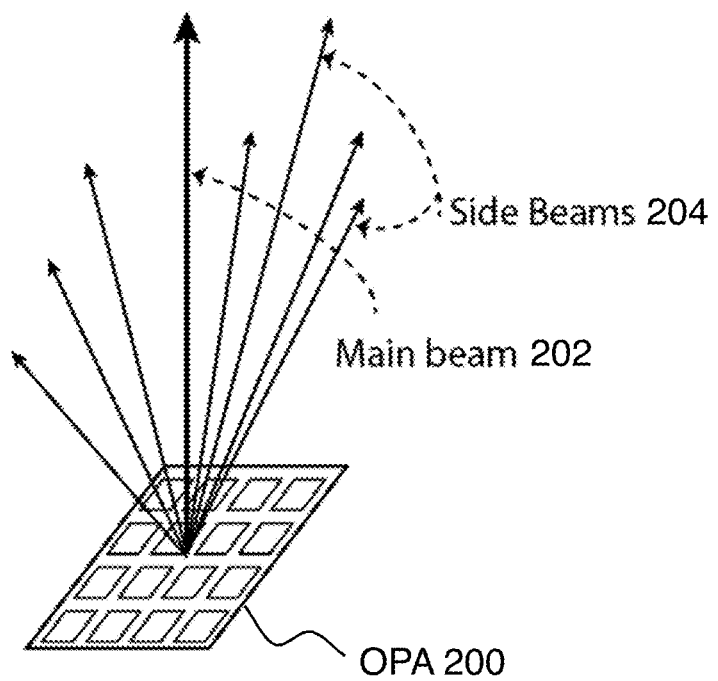
FIGS. 2A and 2B are schematic diagrams of an optical phased array with and without a microlens array, respectively.

FIG. 1 shows an example of an OPA 100 and a corresponding beam steering range 102 over which a beam, resulting from interference among the optical waves emitted from the emitter elements, can be steered. In this example, the maximum angle of emission from the reference line 104, which is perpendicular (normal) to the surface over which the emitter elements are arranged, is limited by the possible presence of side beams. The reference line 104 happens to be centered on one of the emitter elements in this example, but may not be in other examples, such as the example of FIGS. 2A-2B with an OPA 200. In the example of FIG. 2A, there is a main beam 202 whose direction of peak intensity is coincident with a center reference line, and side beams 204 (also known as grating beams, grating lobes, or side lobes) that have peak intensity in various directions with larger beam angles with respect to the center reference line.

Figure 2B:
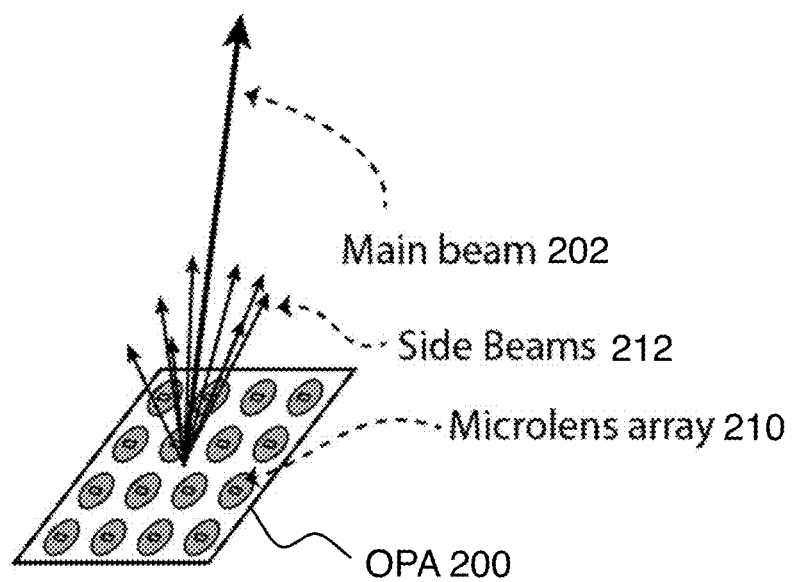
Figure 3:
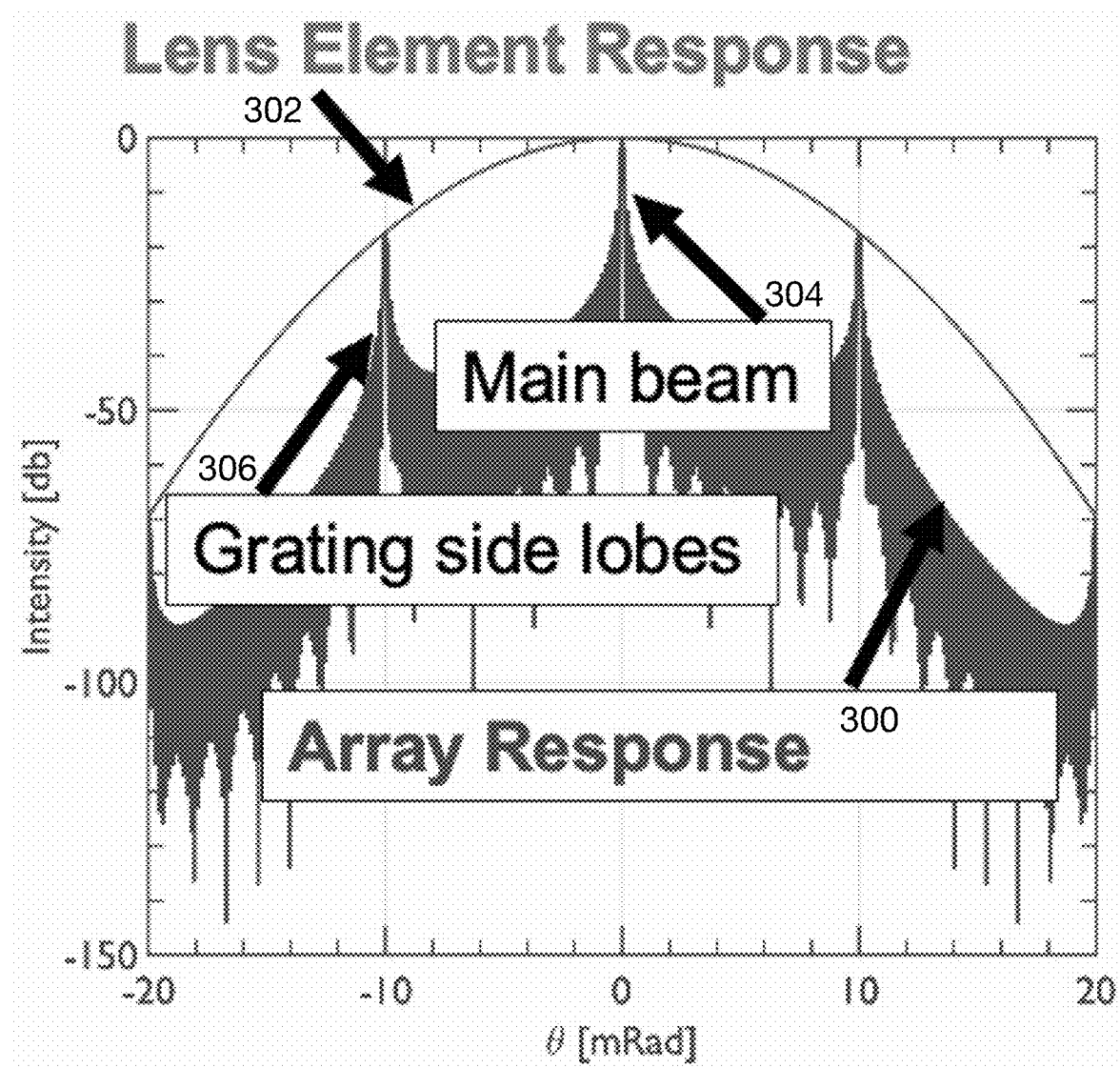
FIG. 3 is a plot of intensity vs. emission angle for an array response and a lens element response.

The side beams can be suppressed by characteristics of the emitter elements represented by the element factor. Additionally, as shown in FIG. 2B, the presence of a microlens array 210 on the emitter elements of the OPA 200, or on a chip on top of the emitter elements, can further suppress the emission into the side beams 212 (as illustrated by the shorter arrows representing the side beams 212). Nevertheless, the presence of the side beams limits the range the main beam can steer to before the unwanted emission into the grating lobes becomes significant. FIG. 3 shows examples of an array response 300 and a lens element response 302 that show relative intensity of optical radiation (in logarithmic units of dB) emitted relative to a center angle (in units of mRad). The array response 300 has a peak 304 corresponding to a main beam and a peaks 306 corresponding to grating side lobes. Referring back to FIG. 1, in some implementations, it is useful to reduce the pitch between the emitter elements (e.g., the size of a unit cell 106 in both dimensions, represented in FIG. 1 as Pitch 1 and Pitch 2).

Figure 4A:
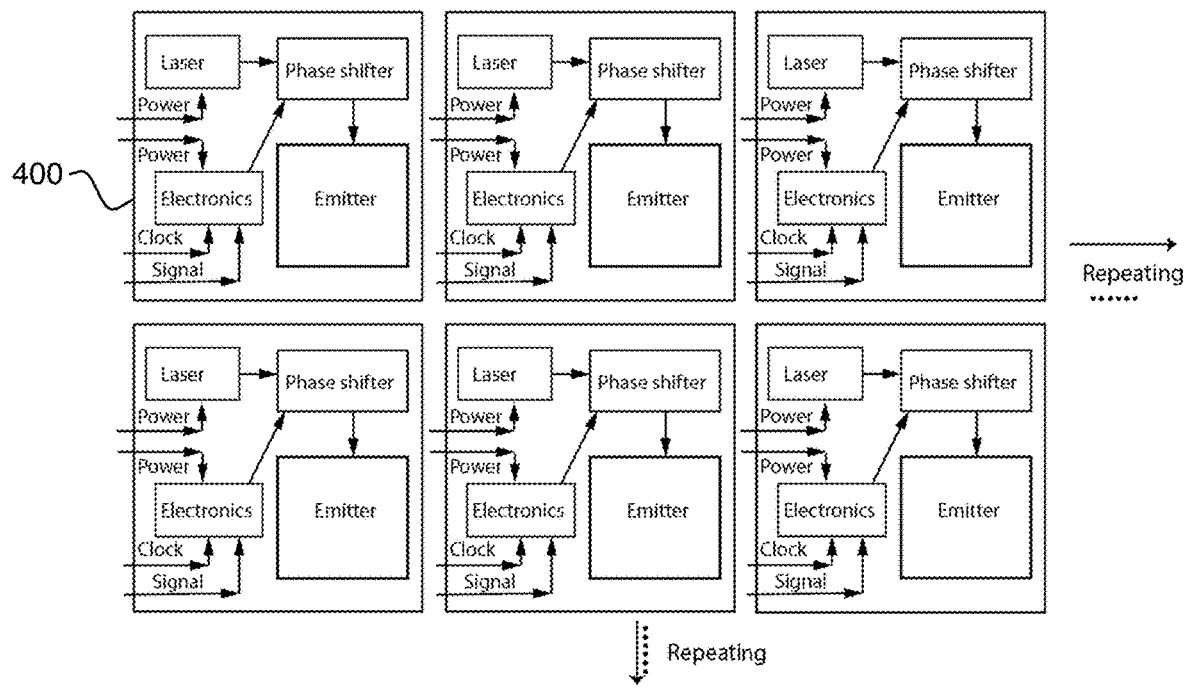
FIGS. 4A and 4B are schematic diagrams of examples of unit cell arrangements for OPA-based systems.

The size of the unit cell 106 can be reduced to a certain limit based on the sizes and arrangement of various other elements in a given OPA-based system. In one example of a self-contained unit cell approach, FIG. 4A shows an arrangement of unit cells 400 that include a variety of electronic and photonic components that can be used for self-sustained operation of each unit cell 400 on the same chip as the unit cell 400, with a reduced set of components needed outside each unit cell 400 and/or on a different chip (e.g., a digital or analog electronic component providing an input signal to electronics determining a phase shift of the phase shifter, and components providing power to powered components).

Figure 4B:
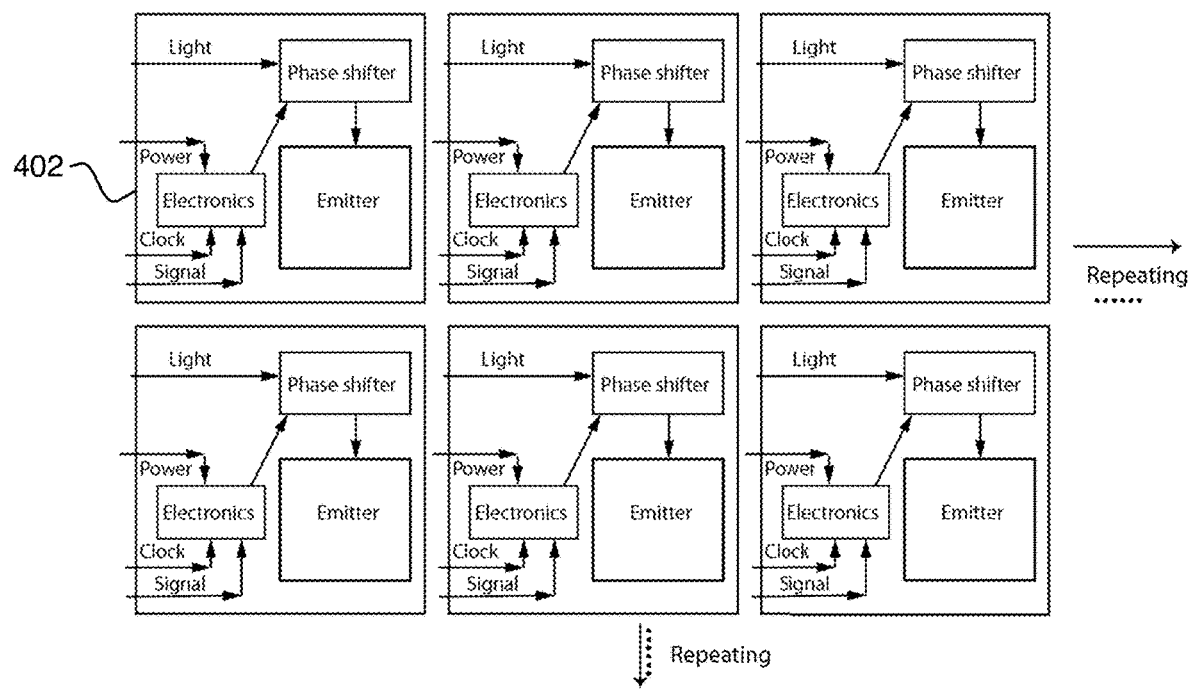

In other examples, it is possible that more of the components can be located outside of the unit cells. For example, FIG. 4B shows an arrangement of unit cells 402 in which the laser light is externally delivered to the unit cells 402 from one or more lasers outside of the unit cells. If light from the same laser is distributed to all unit cells 402, unlike the approach of FIG. 4A, there is no need for locking the frequency and phase of all unit cell lasers. In this approach, only one laser is centrally controlled, and the phase is adjusted at each unit cell 402 to ensure diffraction limited beams and to provide direct the beam steering. Nevertheless, each unit cell 402 contains, in addition to the emitter element, the electronics for electronic control (e.g., 3D bonded) and the phase shifter. By way of example, electro-optic phase shifters are usually long (e.g., cm-scale) and take up a relatively large area inside each of the unit cells 402. Thermal-based phase shifters either consume a relatively large amount of power (e.g., 10 mW-level) or need to be thermally isolated by undercutting the substrate beneath them. In either case, fitting any of a variety of types of phase shifter (e.g., electrooptic, liquid crystal, thermal, fluidic, etc.) in a wavelength-scale unit cell may be difficult and this limit on emitter density can limit the steering angle of the system.

Figure 5:
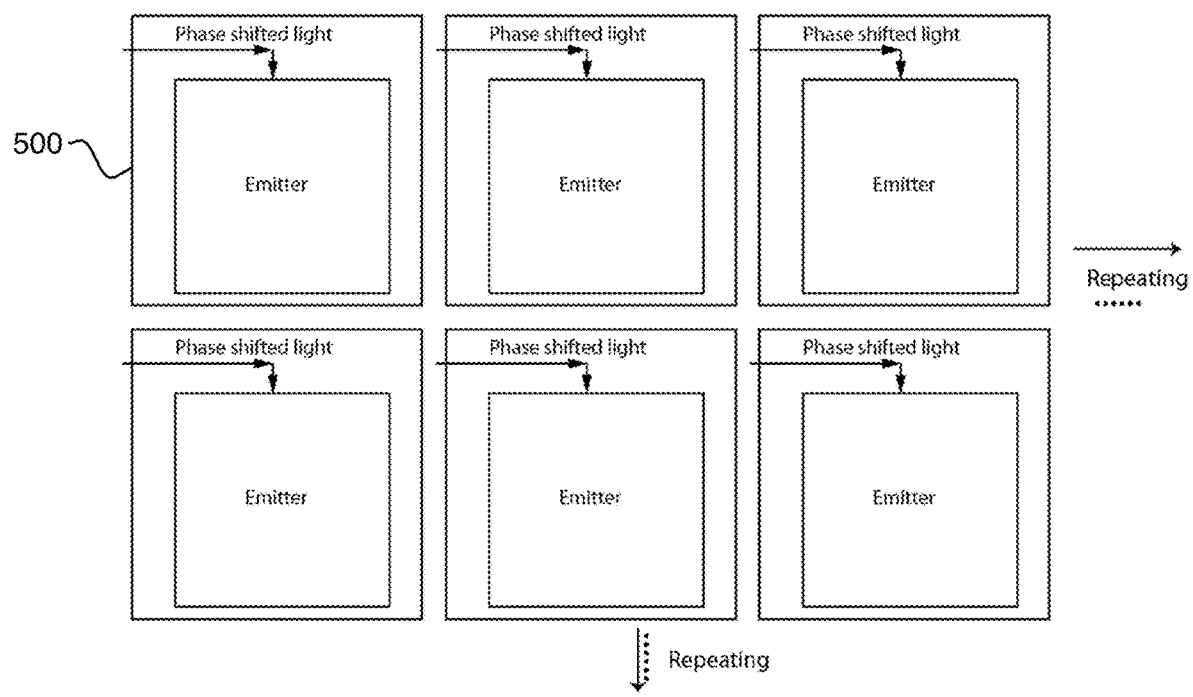
FIG. 5 is a schematic diagram of an example of a unit cell arrangement with a denser array of emitter elements.

Some implementations described herein use techniques that enable more of the electronic and photonic components associated with each emitter element to be provided on a different chip from the chip containing the array of emitter elements. This enables the sizes of the unit cells to be reduced such that they are closer in size to the size of the emitter elements, which enables a denser arrangement of emitter elements (also referred to herein as simply "emitters"). For example, in some implementations, the light source, the electronic control, and the phase shifters can be placed externally from the unit cells, as for the unit cells 500 shown in FIG. 5.

Figure 6:
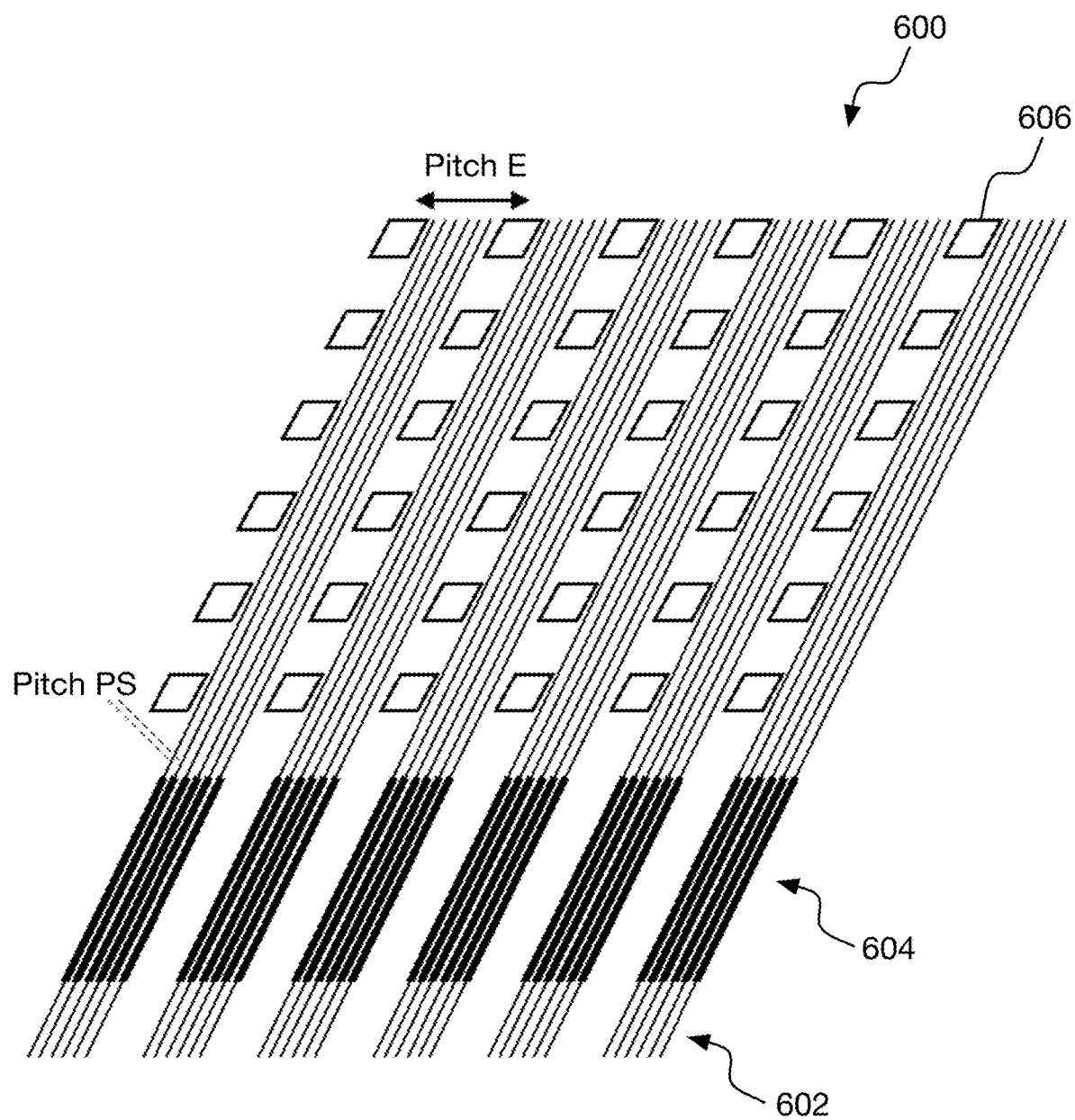
FIG. 6 is a schematic diagram of an example of an array of emitters with phase shifters on the same chip.

As shown in FIG. 6, an example of a pitch-constrained OPA 600 includes an array of waveguides 602 that carry light through phase shifters 604 and deliver phase-shifted light to individual emitters 606 arranged in a 2D array. In this scenario, each of the phase shifters 604 corresponds to one of the emitters 606, with sets of six waveguides each delivering light to a different one of the six emitters to the left of that set of waveguides. For a square shaped array as in this example, as the size of the 2D array grows, the number of phase shifters is increased with the square of the array width. If one side of the array is used for light delivery, the space dedicated to each phase shifter is reduced as the size of the array is increased. Therefore, at a certain array size, even if the phase shifters and waveguides in FIG. 6 are placed as close as physically possible, the phase shifter spacing (e.g., a spacing of Pitch PS) may still become the bottleneck for the array size and emitter pitch (e.g., an emitter spacing of Pitch E>Pitch PS), and may also limit the field of view (FOV) accordingly.

Figure 7A:
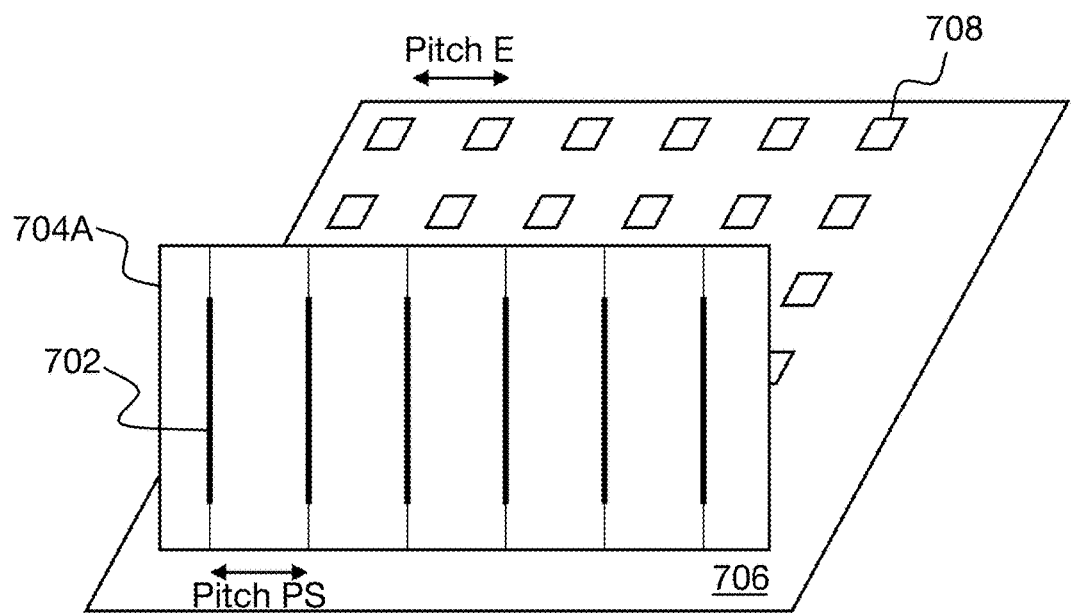
FIGS. 7A and 7B are schematic diagrams of examples of arrays of emitters with phase shifters on different chips.
Figure 7B:
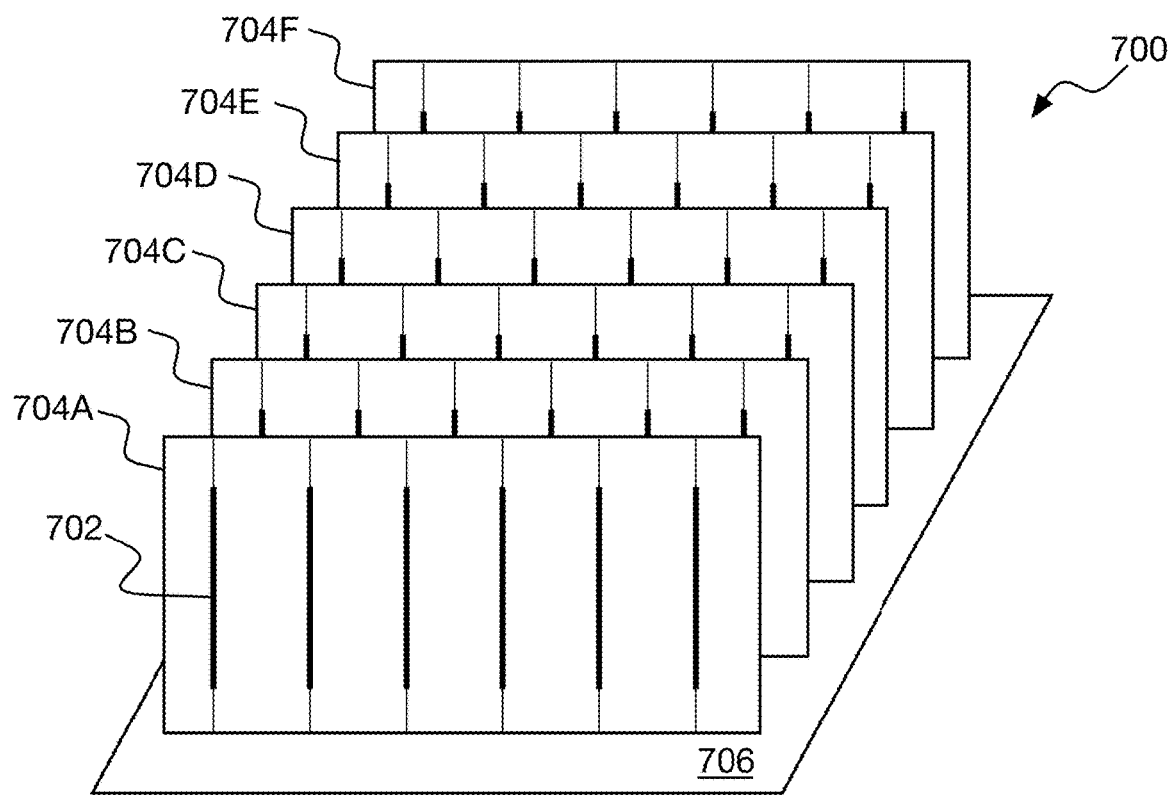

As shown in FIGS. 7A-7B, in an example of an OPA 700 that is not pitch-constrained by the phase shifters, the phase shifters 702 can be placed on separate phase shifter chips 704A-704F and vertically coupled to the emitter chip 706. FIG. 7A shows a view of a single phase shifter chip 704A vertically coupled to the emitter chip 706 such that each of the phase shifters 702 provides a phase-shifted optical wave to be coupled to the emitter chip 706 from an edge surface of the phase shifter chip 704A. In this scenario, the phase shifter spacing Pitch PS is no longer a bottleneck for the array size and emitter pitch. In some implementations, Pitch E substantially equal to Pitch PS, or smaller than Pitch PS. FIG. 7B shows a view of each of the phase shifter chips 704A-704F. An edge surface of each of the phase shifter chips 704A-704F is in proximity to a row of proximal ends of optical waveguide segments (not shown) coupled to a corresponding one of the emitters 708.

Figure 8A:
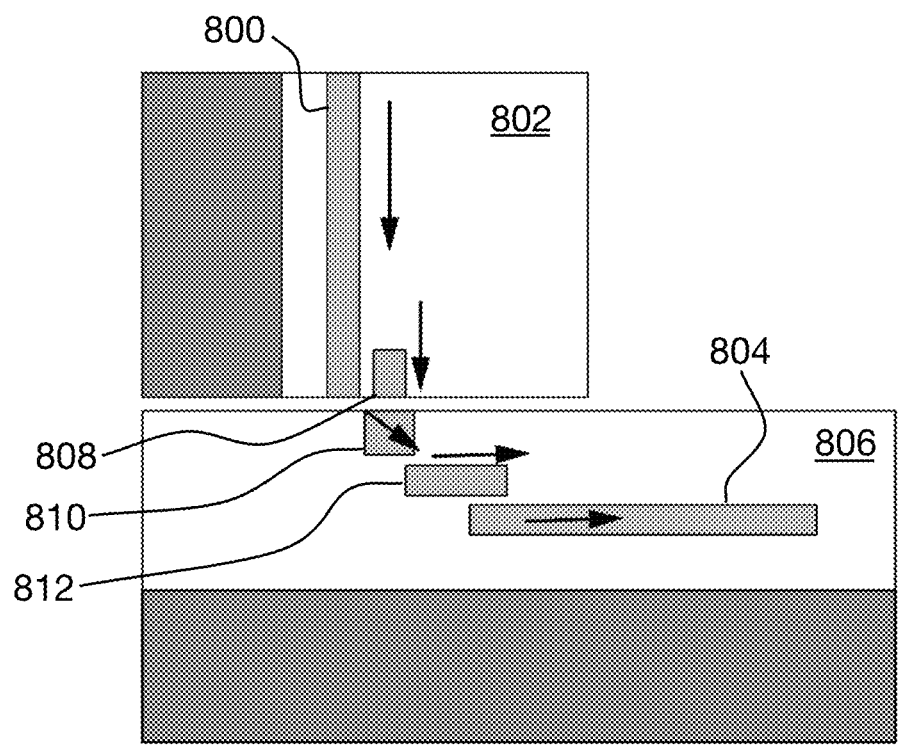
FIGS. 8A and 8B are schematic diagrams of example coupling arrangements.
Figure 8B:
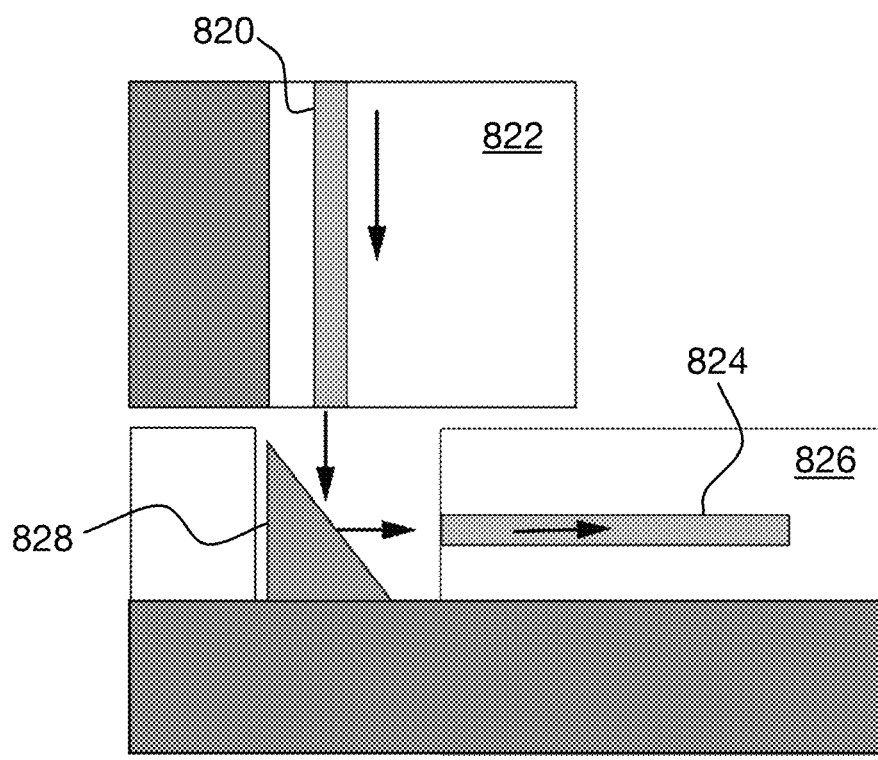

The coupling of phase-shifted light from each of the phase shifter chips to the emitter chip can be performed in a variety of different ways. For example, FIGS. 8A and 8B show two different example couplers, with the arrows showing direction of light propagation. FIG. 8A shows an example in which a waveguide 800 extending to an edge surface of a portion of a phase shifter chip 802 is coupled to an orthogonal waveguide 804 within a portion of an emitter chip 806. In this example, multiple guiding layers on the two chips are used to gradually transform the direction of light guiding from one direction in the illustrated portion of the phase shifter chip 802 to a perpendicular direction in the illustrated portion of the emitter chip 806. A short transitional waveguide portion 808 is aligned with a short transitional waveguide portion 810 to transfer light from the waveguide 800. An intermediate waveguide portion 812 in another layer transitions to the waveguide 804 in a lower layer (further from a surface of the emitter chip 806). Alternatively, FIG. 8B shows another example in which a waveguide 820 extending to an edge surface of a portion of a phase shifter chip 822 is coupled to an orthogonal waveguide 824 within a portion of an emitter chip 826. In this example, a slanted surface of an optical element 828 is utilized as a mirror to redirect light from the waveguide 820 to the waveguide 824. This reflective surface can work based on total internal reflection at a surface between higher index and lower index materials, for example, or based on a reflective coating containing metal or other highly reflective material and/or layers of materials, for example. Other examples can use other techniques, such as a grating coupler connected to an optical waveguide.

Figure 9:
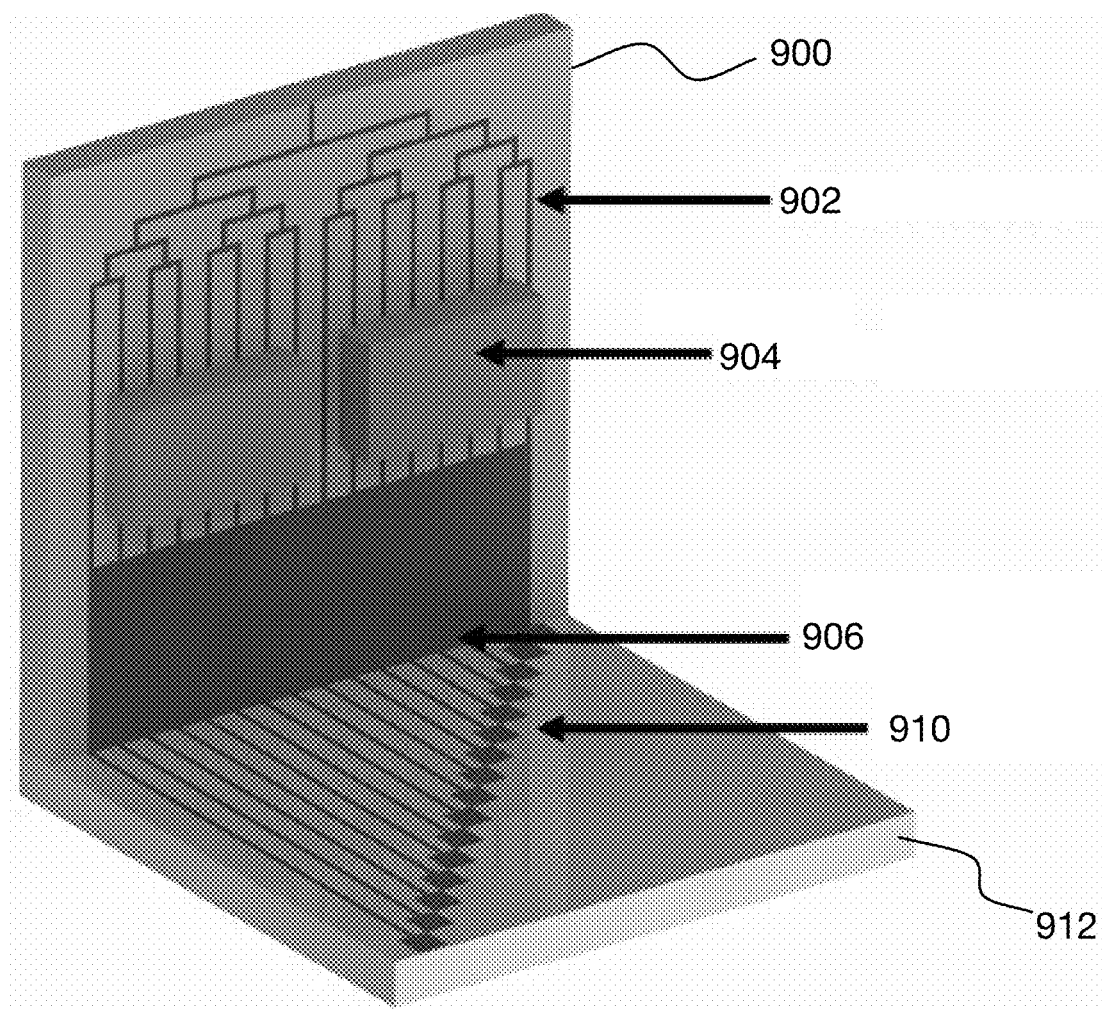
FIG. 9 is a schematic diagram of a portion of a phase shifter chip coupled to a portion of an emitter chip.

In these examples of FIGS. 8A and 8B, the light coupled from the vertical phase shifter chip to the horizontal emitter chip acquires the pre-defined phase pattern before entering the emitter chip. The optical phase shifter devices on the phase shifter chip can be controlled electronically. This can be done with electronic signals delivered to the chip externally (with possibly thousands of electrical connections) or with one or more driver chips (e.g., application-specific integrated circuit (ASIC) driver chips) directly bonded to the phase shifter chip. FIG. 9 shows an example in which a phase shifter chip 900 includes a distribution tree 902 of waveguides delivering light that enters at a root waveguide at the top, a series of phase shifters (not shown) controlled by two driver chips 904, and a series of directional couplers 906 that couple phase-shifted light into respective emitters 910 arranged on a portion of an emitter chip 912. The distribution tree 902 can be implemented, for example, by an optical distribution network of binary (1:2) waveguide splitters. The emitters 910 are arranged along a diagonal line in this example, which increases the fill factor of the array of emitters. Other implementations can have a different distribution of the emitter 910. The driver chips 904 can be configured to receive digital instructions from a serially coded signal and assign appropriate voltage or current signals to different phase shifters. By providing these electrical connections for controlling the phase shifters using driver chips 904 directly attached to the surface of the phase shifter chip 900, the number of additional electrical connections that need to be supplied to these vertically coupled phase shifter chips can be significantly reduced.

Figure 10:
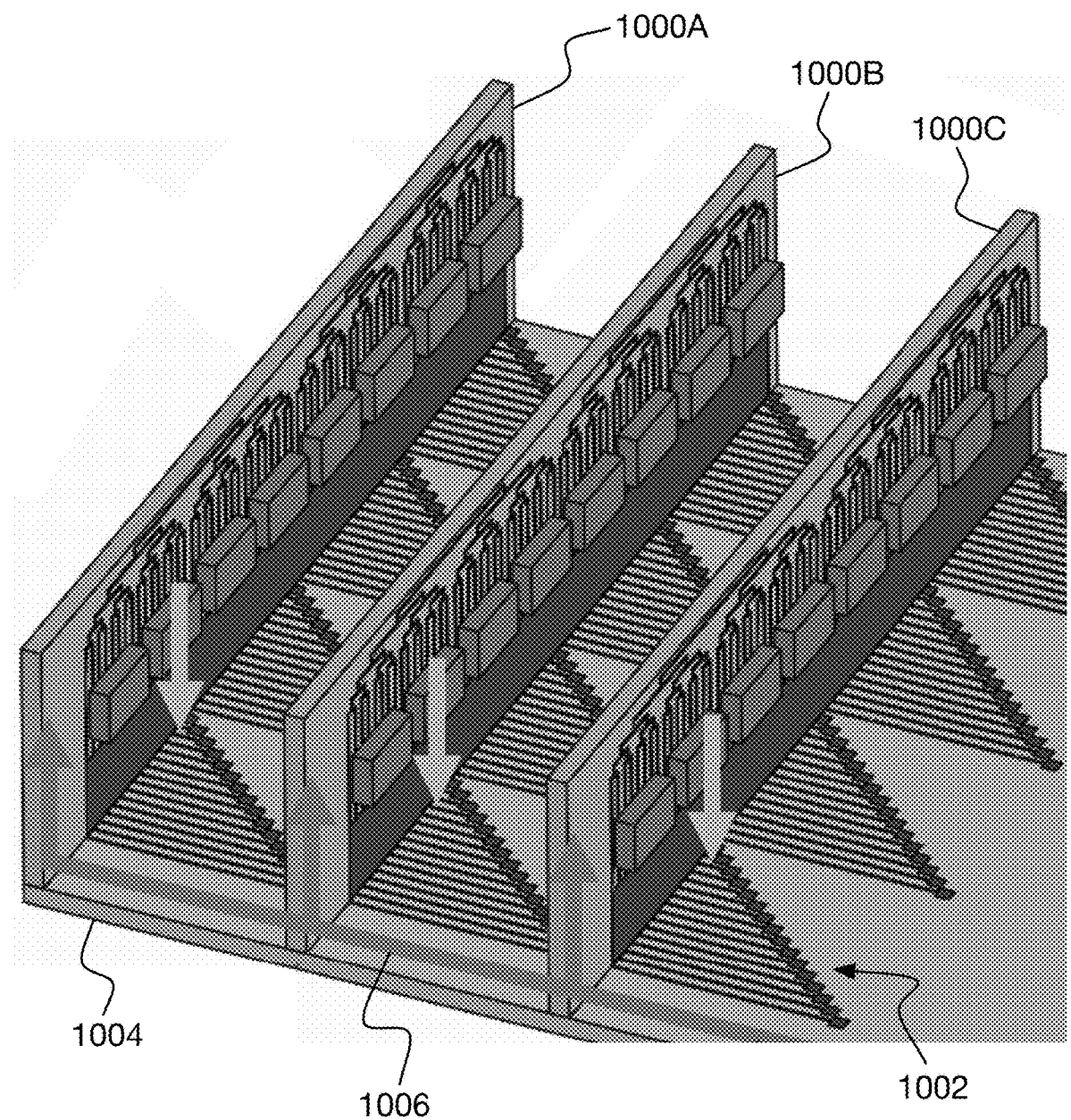
FIG. 10 is a schematic diagram of multiple phase shifter chips coupled to an emitter chip.

As part of achieving a goal of this vertical coupling mechanism to increase the density of phase shifters and emitters, more than one phase shifter chip can be used as shown in FIG. 10. These multiple phase shifter chips 1000A, 1000B, 1000C, . . . can control the phase of the light delivered to emitters 1002 arranged over an emitter chip 1004. To keep the optical coherence among all emitters 1002, laser light from the same laser (not shown) can be distributed among all phase shifter chips through an optical delivery bus waveguide 1006 extending along the edge of the emitter chip 1004. The light can be amplified along the way to keep the amplitude of light delivered to phase shifter chips substantially constant (or amplified by a predetermined amount for each phase shifter chips according to a predetermined pattern). As can be seen in FIG. 10, light is sent down the bus waveguide 1006 on the emitter chip and an appropriate portion of the light from the bus waveguide 1006 is tapped off and coupled up to be redirected along the edges of the phase shifter chips and coupled into the roots of the distribution trees for delivery of phase-shifted light back into the emitter chip 1004 by directional couplers at the bottom of the phase shifter chips. Of course, other methods of light delivery to the phase shifter chips are also possible. For example, an array of optical fibers can be coupled to the individual phase shifter chips to deliver the laser light, or individual lasers can be mounted or coupled to these phase shifter chips. Some implementations can include circuitry to lock the frequency and/or phase of each of the individual lasers.

In different implementations, the emitters can be configured to emit light either from the same or opposite side of the emitter chip as the side being coupled to the phase shifter chips. In some implementations, the emitters couple light to the opposite surface of the emitter chip from the surface coupled to the phase shifter chips, such that light is emitted without having to pass between the phase shifter chips (i.e., the downward direction in FIG. 10). In this downward emission direction, other optical elements, such as a microlens array (as in the example of FIG. 12), can be integrated, and light can be guided to emitters that are placed on the opposite surface under the phase shifter chips, which facilitates a larger fill factor for the array. In the other emission direction (i.e., the upward direction in FIG. 10), in which the emitted light propagates through the spaces between the phase shifter chips, the arrangement of emitters may be affected by the thicknesses and lengths of the phase shifter chips. For example, if the phase shifter chips are relatively long, there is the potential for diffraction to affect the light emitted from the emitters. However, in this upward emission direction, there is no need for the light to be propagated through the substrate (e.g., a silicon substrate) of the emitter chip. In some implementations, to facilitate downward emission through the substrate, the emitter chip can be formed with a glass substrate, as described in U.S. Pat. No. 10,775,559, incorporated herein by reference.

Figure 11A:
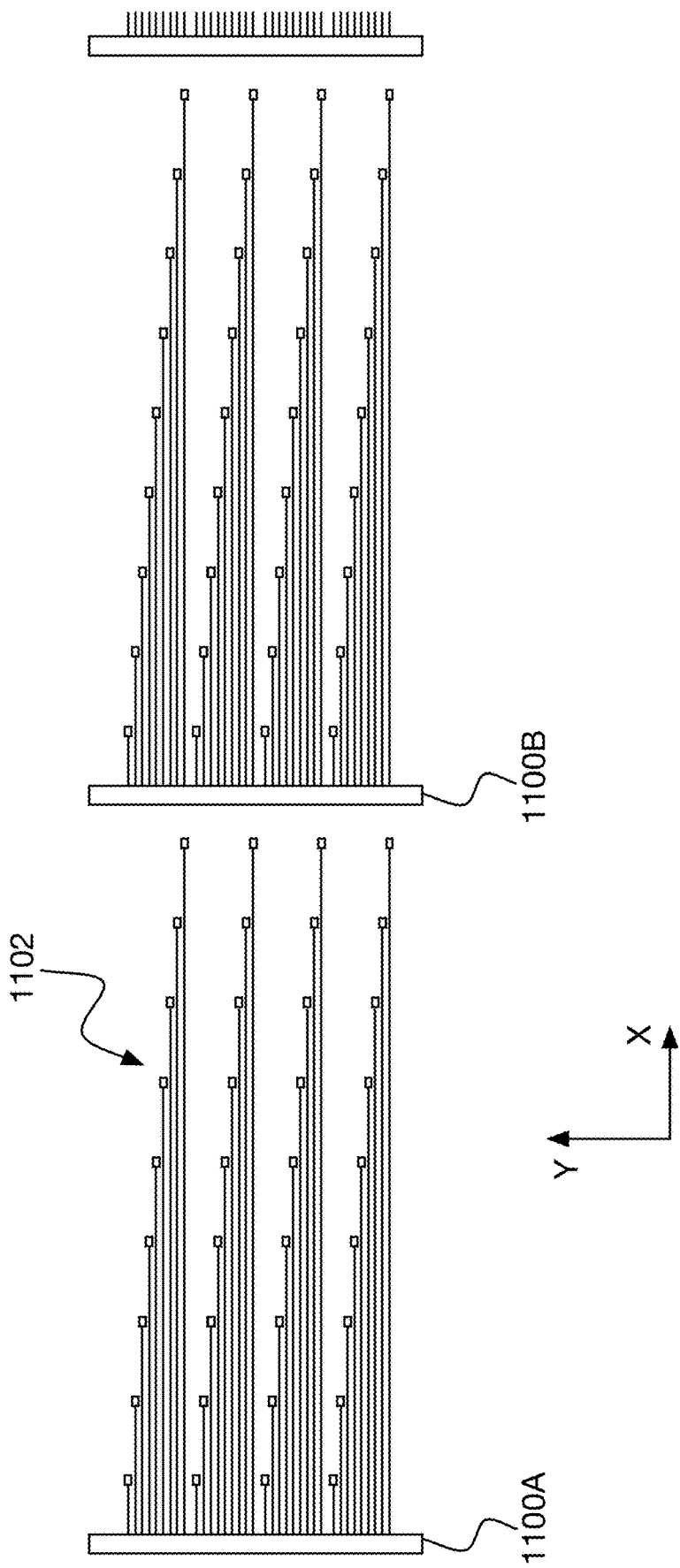
FIGS. 11A and 11B are schematic diagrams of example arrangements of emitters.
Figure 11B:
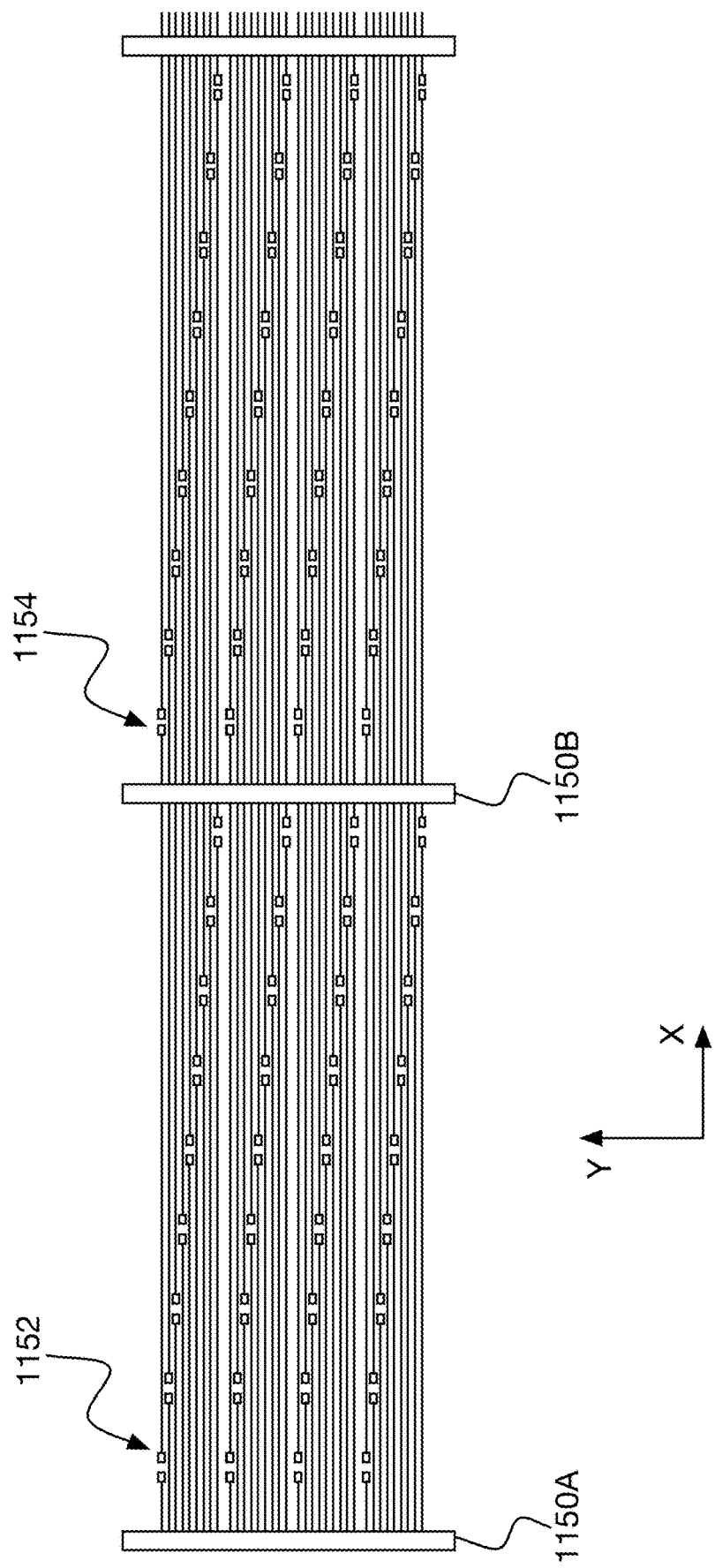

The waveguides delivering the light can have different lengths to allow the emitters to be arranged along diagonal lines to increase the fill factor of the entire array of emitters. As shown in FIGS. 9 and 10, the emitters can be arranged such that a series of emitters emit optical waves from the surface of the emitter chip along lines that are at an angle relative to the optical waveguides delivering the light. As shown in FIG. 11A, for different phase shifter chips 1100A, 1100B, . . . the emitters 1102 of different sets of adjacent emitters can be staggered based on the density of the waveguides in one direction and the lengths of the waveguides in the other direction such that a similar density of emitters over the surface of the emitter chip is achieved in each of two orthogonal directions (e.g., in both X and Y directions). FIG. 11B shows an alternative arrangement in which different phase shifter chips 1150A, 1150B, . . . provide phase shifted light to emitters arranged on both sides of each phase shifter chip. For example, phase shifter 1150B couples light to a waveguide segment that provides light to an emitter 1152 on the left side, and couples light to a waveguide segment that provides light to an emitter 1154 on the right side. This arrangement (of FIG. 11B) fills in the empty space on the emitter chip (compared to the arrangement of FIG. 11A) with waveguides feeding additional emitters (twice the number of emitters in this example), and thus enables a higher emitter density on the emitter chip.

Figure 12:
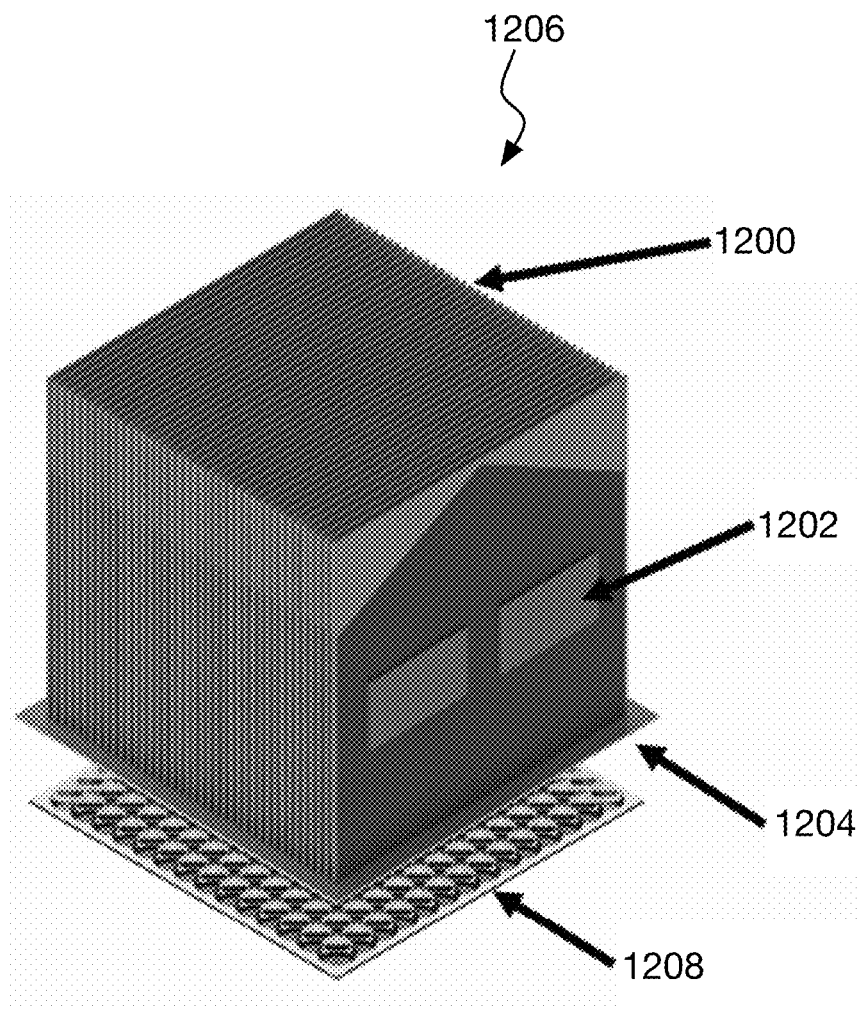
FIG. 12 is a schematic diagram of an example structure of multiple phase shifters coupled to an emitter chip.

To achieve a high density of the emitters on the emitter chip, the phase shifter chips should be placed close to each other. To achieve such close packing the phase shifter chips can be thinned down so that the separation between then can be minimized. Moreover, the driver chips controlling the phase shifters and directly bonded on top of the phase shifters can be thinned down too. As can be seen in FIG. 12, the resulting structure from close packing of thinned down phase shifter chips 1200, with driver chips 1202 coupled to the phase shifters, and with the phase shifter chips 1200 coupled to an emitter chip 1204, is a three-dimensional (3D) structure 1206 (e.g., an approximately cube shaped structure) with its dimensions determined by the lengths of the phase shifters on the phase shifter chips 1200, their packing pitch, and the number of the phase shifters on each phase shifter chip. Moreover, the thickness of the stack of phase shifter chips 1200 is determined by how closely the phase shifter chips are stacked and how many phase shifter chips are used. The mechanical stability of the system can be achieved, for example, by epoxy bonding of all phase shifter chips 1200, which can lead to a solid phase shifter cube as the 3D structure 1206. It is also possible that the resulting 3D structure 1206 is polished to have a smooth surface on the side that is coupled into the emitter chip 1204. The output of the emitter chip 1204, emitting away from the phase shifters can be coupled to a pitch matched microlens array 1208, such that each emitter is emitting into one of the lenses, to increase the fill factor and limit the emission angle of each emitter to suppress sidelobes.

Figure 13A:
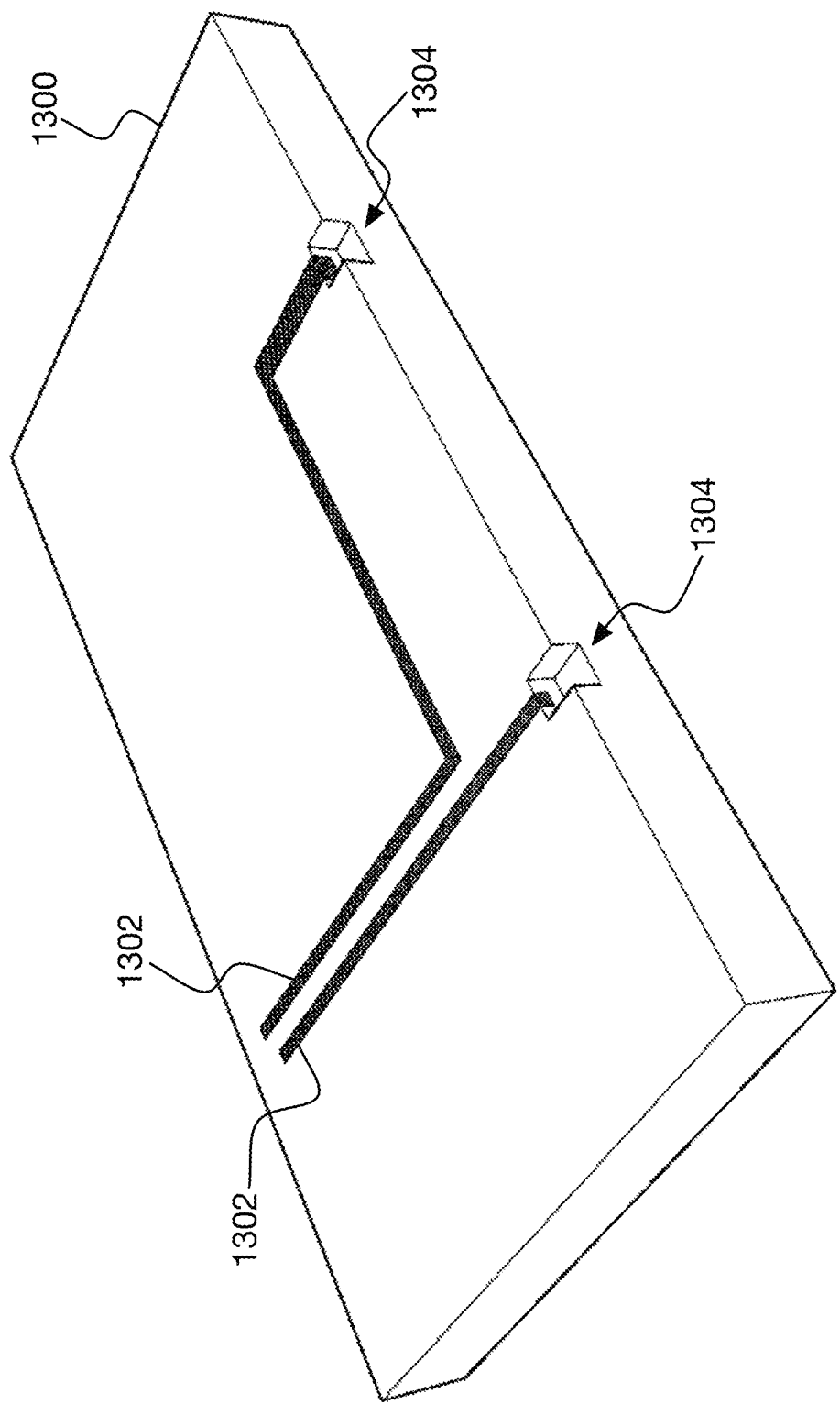
FIGS. 13A-13D are schematic diagrams of an example assembly of phase shifter chips into a structure with trenches and pads for coupling electronic control signals.

The polishing of the side of the 3D structure also helps with achieving electrical contacts to the chip. In some implementations, an electrical interface can be formed on the side of the 3D structure 1206. As can be seen in FIG. 13A, a phase shifter chip 1300 can include trenches 1302 that are filled with a conducting material (e.g., metal) and end at larger notches 1304 at the edge of the phase shifter chip 1300, which can also be filled with conducting material. Alternatively, in some implementations the trenches 1302 end at the edge without requiring larger notches.

Figure 13B:
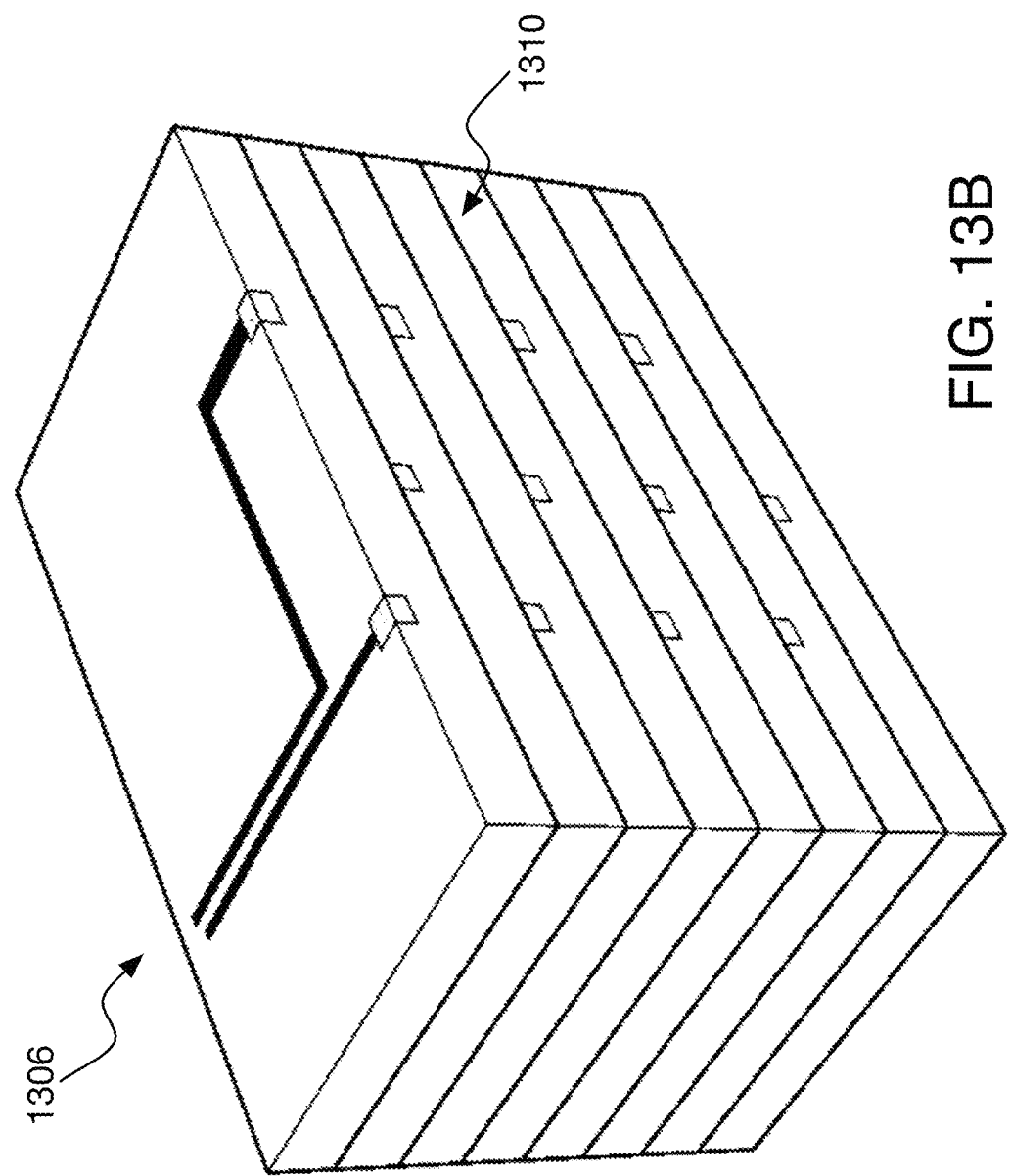
Figure 13C:
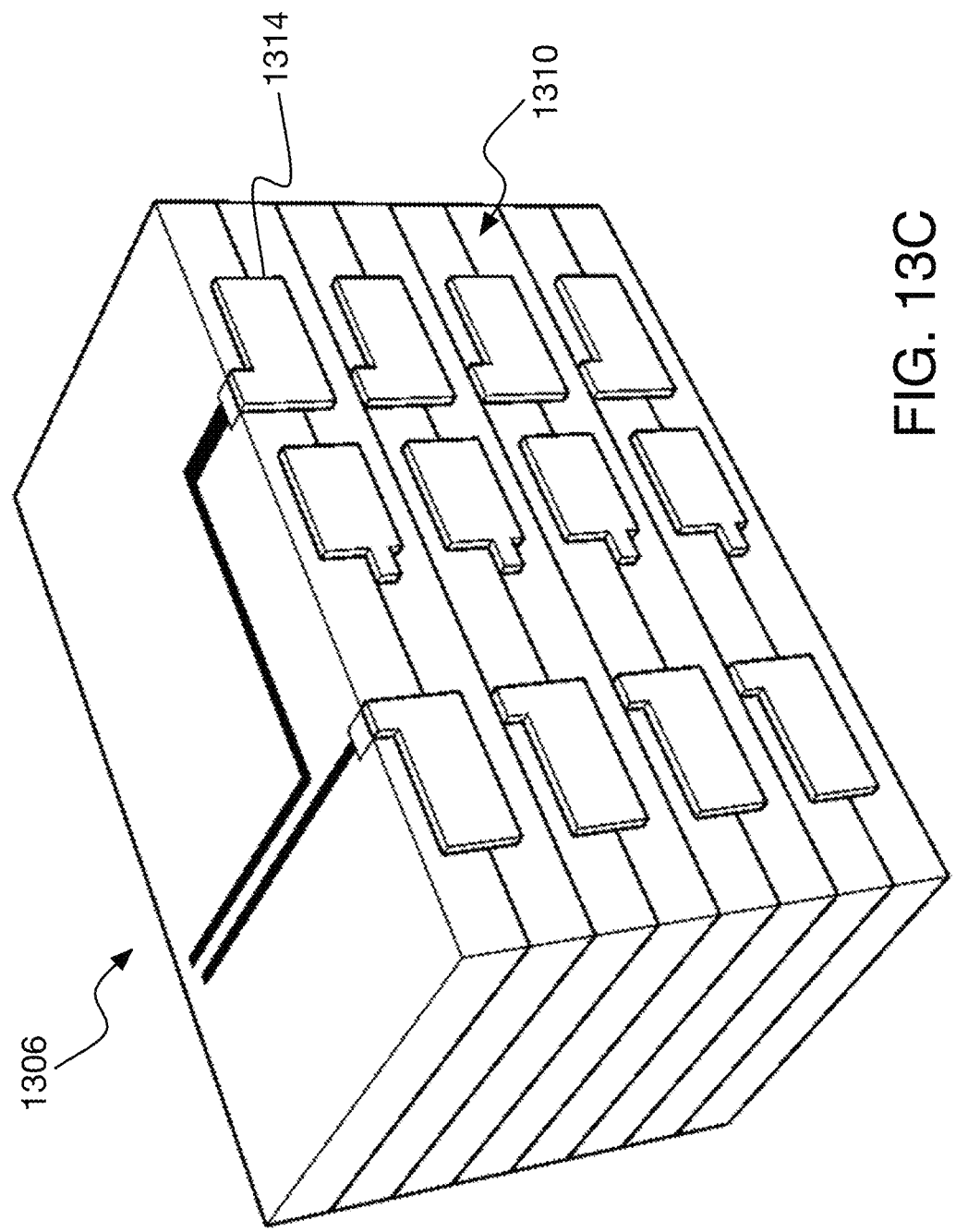
Figure 13D:
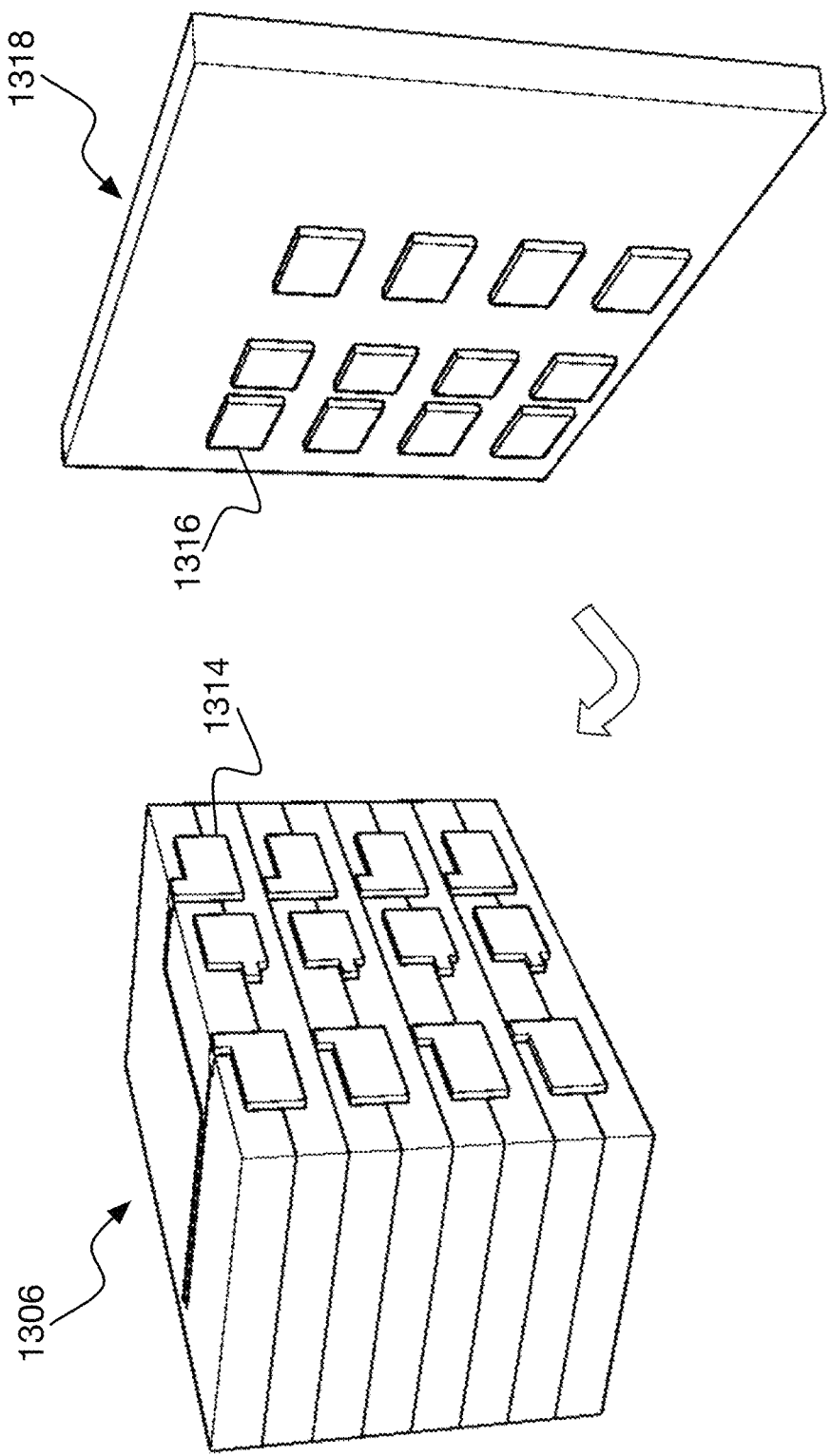

FIG. 13B shows a 3D structure 1306 of multiple phase shifter chips stacked on top of each other. When an edge facet 1310 of the 3D structure 1306 is polished, the metal filled trenches and notches can act as contact vias into the structure 1306. Referring to FIG. 13C, the facet 1310 can be lithographically patterned and connection pads 1314 can be formed on the facet 1310. In some implementations, additional wires and metal routing can be created on the facet 1310 as needed. Referring to FIG. 13D, these connection pads 1314 can be utilized to couple the resulting structure 1306 to corresponding connection pads 1316 on a control chip 1318 for providing the electrical signals. This can be achieved, for example, by patterning metal pillars (e.g., copper pillars) on the control chip 1318 and pressing the connection pads 1314 onto the pillars. In some implementations, the control chip 1318 can be the same chip as the emitter chip if there is space between the connection pads 1314 and 1316 for the optical coupling. It is also possible that the electric signals are delivered to the phase shifters within the structure 1306 from the opposite end of the structure 1306 through an interposer, or by wirebonding to a printed circuit board (PCB), for example.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus comprising:
   a first integrated circuit comprising:
     a plurality of sets of optical waveguides, each set of optical waveguides including a plurality of optical waveguide segments, and
     a plurality of optical emitter elements arranged over a first surface of the first integrated circuit, each optical emitter element coupled to a distal end of one of the optical waveguide segments;
   a second integrated circuit comprising:
     a plurality of optical phase shifters that each provide a phase-shifted optical wave that is coupled to the first integrated circuit from a first edge surface of the second integrated circuit; and
   a third integrated circuit comprising:
     a plurality of optical phase shifters that each provide a phase-shifted optical wave that is coupled to the first integrated circuit from a first edge surface of the third integrated circuit;
   wherein
     the first edge surface of the second integrated circuit is in proximity to a row of proximal ends of the optical waveguide segments of a first set of the plurality of sets of optical waveguides, and
     the first edge surface of the third integrated circuit is in proximity to a row of proximal ends of the optical waveguide segments of a second set of the plurality of sets of optical waveguides.

2. The apparatus of claim 1, wherein the second integrated circuit and the third integrated circuit are each substantially perpendicular to the first integrated circuit.

3. The apparatus of claim 1, wherein, in each set of optical waveguides, the plurality of optical waveguide segments in that set of optical waveguides are substantially parallel to each other.

4. The apparatus of claim 3, wherein all of the plurality of optical waveguide segments in all of the sets of optical waveguides are substantially parallel to each other.

5. The apparatus of claim 3, wherein, in each set of optical waveguides, a plurality of optical waveguide segments in that set of optical waveguides have a different length from each other.

6. The apparatus of claim 5, wherein the plurality of optical emitter elements coupled to the distal ends of the optical waveguide segments in at least one of the sets of optical waveguides are arranged to emit optical waves from the first surface of the first integrated circuit along a line that is between 5 and 60 degrees relative to each of the parallel optical waveguide segments.

7. The apparatus of claim 1, wherein at least a first of the phase-shifted optical waves coupled to the first integrated circuit from the first edge surface of the second integrated circuit is coupled to a proximal end of a first optical waveguide segment of the first set of the plurality of sets of optical waveguides in a first layer of the first integrated circuit.

8. The apparatus of claim 7, wherein the first phase-shifted optical wave is coupled to the proximal end of the first optical waveguide segment by a portion of a waveguide in a second layer of the first integrated circuit that is closer to a surface of the first integrated circuit than the first layer of the first integrated circuit.

9. The apparatus of claim 7, wherein the first phase-shifted optical wave is coupled to the proximal end of the first optical waveguide segment by a reflective surface in the first integrated circuit configured to redirect the phase-shifted optical wave into the proximal end of the first optical waveguide segment.

10. The apparatus of claim 1, wherein the first surface of the first integrated circuit is a surface adjacent to the first edge surface of the second integrated circuit and the first edge surface of the third integrated circuit.

11. The apparatus of claim 1, wherein the first surface of the first integrated circuit is a surface opposite from a surface adjacent to the first edge surface of the second integrated circuit and the first edge surface of the third integrated circuit.

12. The apparatus of claim 1, wherein
   the second integrated circuit comprises:
     a first optical distribution network of waveguide splitters that provide optical waves to the plurality of optical phase shifters of the second integrated circuit; and
   the third integrated circuit comprises:
     a second optical distribution network of waveguide splitters that provide optical waves to the plurality of optical phase shifters of the third integrated circuit.

13. The apparatus of claim 12, wherein the first optical distribution network and the second optical distribution network are coupled to an optical waveguide in the first integrated circuit.

14. The apparatus of claim 1, wherein
   the second integrated circuit is coupled to a fourth integrated circuit that provides electrical control signals to the plurality of optical phase shifters of the second integrated circuit; and
   the third integrated circuit is coupled to a fifth integrated circuit that provides electrical control signals to the plurality of optical phase shifters of the third integrated circuit.

15. The apparatus of claim 1, wherein the second integrated circuit and the third integrated circuit are included in a stack of phase shifter integrated circuits providing phase-shifted optical waves that form a structure that has a surface that includes edge surfaces of all of the phase shifter integrated circuits.

16. The apparatus of claim 15, wherein
the second integrated circuit includes a plurality of trenches filled with conductive material that end at the surface of the structure; and
the third integrated circuit includes a plurality of trenches filled with conductive material that end at the surface of the structure.

17. The apparatus of claim 16, a plurality of conductive pads are formed on the surface of the structure in contact with the ends of the trenches of the second integrated circuit and the ends of the trenches of the third integrated circuit.

18. An apparatus comprising:
a first integrated circuit comprising:
a plurality of sets of optical waveguides, each set of optical waveguides including a plurality of optical waveguide segments, and
a plurality of optical emitter elements arranged over a first surface of the first integrated circuit, each optical emitter element coupled to a distal end of one of the optical waveguide segments, with a plurality of the optical emitter elements spaced at a first pitch; and
a second integrated circuit comprising:
a plurality of optical phase shifters that each provide a phase-shifted optical wave that is coupled to the first integrated circuit from a first edge surface of the second integrated circuit, with a plurality of the optical phase shifters spaced at a second pitch substantially equal to the first pitch;
wherein
the first edge surface of the second integrated circuit is in proximity to a row of proximal ends of the optical waveguide segments of a first set of the plurality of sets of optical waveguides.

19. The apparatus of claim 18, wherein the second integrated circuit is substantially perpendicular to the first integrated circuit.

20. A method comprising:
forming a first integrated circuit comprising:
a plurality of sets of optical waveguides, each set of optical waveguides including a plurality of optical waveguide segments, and
a plurality of optical emitter elements arranged over a first surface of the first integrated circuit, each optical emitter element coupled to a distal end of one of the optical waveguide segments, with a plurality of the optical emitter elements spaced at a first pitch; and
attaching a second integrated to the first integrated circuit, the second integrated circuit comprising:
a plurality of optical phase shifters that each provide a phase-shifted optical wave that is coupled to the first integrated circuit from a first edge surface of the second integrated circuit, with a plurality of the optical phase shifters spaced at a second pitch substantially equal to the first pitch;
wherein
the first edge surface of the second integrated circuit is in proximity to a row of proximal ends of the optical waveguide segments of a first set of the plurality of sets of optical waveguides.

\* \* \* \* \*